US010241000B2

(12) United States Patent
Saralajew et al.

(10) Patent No.: US 10,241,000 B2
(45) Date of Patent: Mar. 26, 2019

(54) METHOD FOR CHECKING THE POSITION OF CHARACTERISTIC POINTS IN LIGHT DISTRIBUTIONS

(71) Applicant: Dr. Ing. h.c. F. Porsche Aktiengesellschaft, Stuttgart (DE)

(72) Inventors: Sascha Saralajew, Wiernsheim (DE); Sebastian Soehner, Karlsruhe (DE); Steffen Strebel, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/468,344

(22) Filed: Mar. 24, 2017

(65) Prior Publication Data

US 2017/0336283 A1 Nov. 23, 2017

(30) Foreign Application Priority Data

May 17, 2016 (DE) .......................... 10 2016 109 027

(51) Int. Cl.
*G06K 9/00* (2006.01)
*G01M 11/02* (2006.01)
(Continued)

(52) U.S. Cl.
CPC ......... *G01M 11/02* (2013.01); *G06K 9/00791* (2013.01); *G06K 9/4647* (2013.01); *G06K 9/4661* (2013.01); *G06T 7/75* (2017.01); *G06T 2207/20072* (2013.01); *G06T 2207/30252* (2013.01)

(58) Field of Classification Search
None
See application file for complete search history.

(56) References Cited

U.S. PATENT DOCUMENTS

2013/0084005 A1* 4/2013 Min ..................... H04N 1/4074
382/168
2013/0158960 A1 6/2013 Rentschler et al.
(Continued)

FOREIGN PATENT DOCUMENTS

DE 102010029149 B4 11/2011
DE 102011109440 A1 4/2012
(Continued)

*Primary Examiner* — Stephen P Coleman
(74) *Attorney, Agent, or Firm* — Leydig, Voit & Mayer, Ltd.

(57) ABSTRACT

A method for checking the plausibility of detected features of a light distribution of a headlamp of a motor vehicle includes irradiating, by the headlamp, a scene in surroundings of the motor vehicle; capturing, by a camera of the motor vehicle, the irradiated scene in an image; dynamically seeking and identifying at least one initial optical feature in the image, adaptively producing and analyzing local surroundings of the at least one initial optical feature; dynamically extracting at least one further optical feature from the local surroundings; and carrying out, using a learned algorithm and on the basis of the at least one initial optical feature and the at least one further optical feature, an adaptive check as to whether the at least one initial optical feature and the at least one further optical feature are plausibly arranged in the local surroundings.

9 Claims, 4 Drawing Sheets

(51) Int. Cl.
  *G06T 7/73*    (2017.01)
  *G06K 9/46*    (2006.01)

(56) References Cited

U.S. PATENT DOCUMENTS

| | | | |
|---|---|---|---|
| 2013/0279185 A1 | 10/2013 | Totzauer | |
| 2014/0049639 A1* | 2/2014 | Brosinger | G01M 11/062 348/143 |
| 2014/0368656 A1* | 12/2014 | Hayakawa | G06K 9/00798 348/148 |
| 2016/0320181 A1 | 11/2016 | Foltin et al. | |

FOREIGN PATENT DOCUMENTS

| | | |
|---|---|---|
| DE | 102012214637 A1 | 2/2013 |
| DE | 102014219120 A1 | 6/2015 |
| DE | 102015214792 A1 | 2/2016 |
| EP | 2657077 A2 | 10/2013 |

* cited by examiner

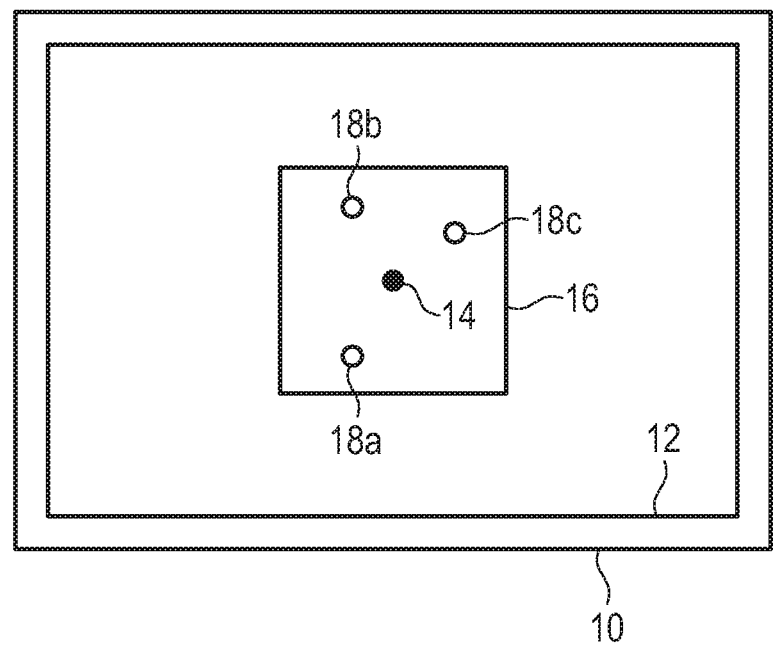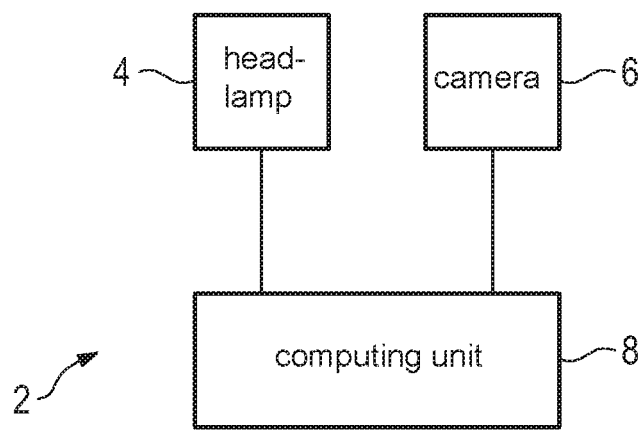
Fig. 1

METHOD FOR CHECKING THE POSITION OF CHARACTERISTIC POINTS IN LIGHT DISTRIBUTIONS

CROSS REFERENCE TO RELATED APPLICATIONS

This application claims benefit to German Patent Application No. DE 10 2016 109 027.1 filed May 17, 2016, which is hereby incorporated by reference herein.

FIELD

The invention relates to a method and a system for checking the position of characteristic points in light distributions of headlamps in particular.

BACKGROUND

A headlamp for a motor vehicle which, for example, is embodied as a matrix headlamp comprises a multiplicity of light-emitting diodes arranged in the shape of a matrix, said light-emitting diodes being individually actuatable. Here, a light distribution of the headlamp is to be set by an appropriate actuation of a respective light-emitting diode. Moreover, the light distribution of the headlamp is to be captured by a sensor.

A method and an apparatus for setting a luminous character-istic of a headlamp are described in document DE 10 2012 214 637 A1. Here, a light distribution of a region of an image of surroundings of the headlamp is ascertained and the luminous characteristic of the headlamp is determined on the basis of the light distribution and a predetermined value envisaged to this end.

Furthermore, document EP 2 657 077 A2 describes a method for compensating an alignment error of a headlamp. A method for adjusting and/or calibrating a headlamp of a vehicle is known from document DE 10 2011 109 440 A1. Document DE 10 2014 219 120 A1 describes a method for determining a lighting-range device of a headlamp.

SUMMARY

In an embodiment, the present invention provides a method for checking the plausibility of detected features of a light distribution of a headlamp of a motor vehicle. The method includes irradiating, by the headlamp, a scene in surroundings of the motor vehicle; capturing, by a camera of the motor vehicle, the irradiated scene in an image; dynamically seeking and identifying at least one initial optical feature in the image; adaptively producing and analyzing local surroundings of the at least one initial optical feature; dynamically extracting at least one further optical feature from the local surroundings; and carrying out, using a learned algorithm and on the basis of the at least one initial optical feature and the at least one further optical feature, an adaptive check as to whether the at least one initial optical feature and the at least one further optical feature are plausibly arranged in the local surroundings.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a schematic illustration of an embodiment of the system according to the invention and an image which is used in at least one embodiment of the method according to the invention.

DETAILED DESCRIPTION

Figure 2:
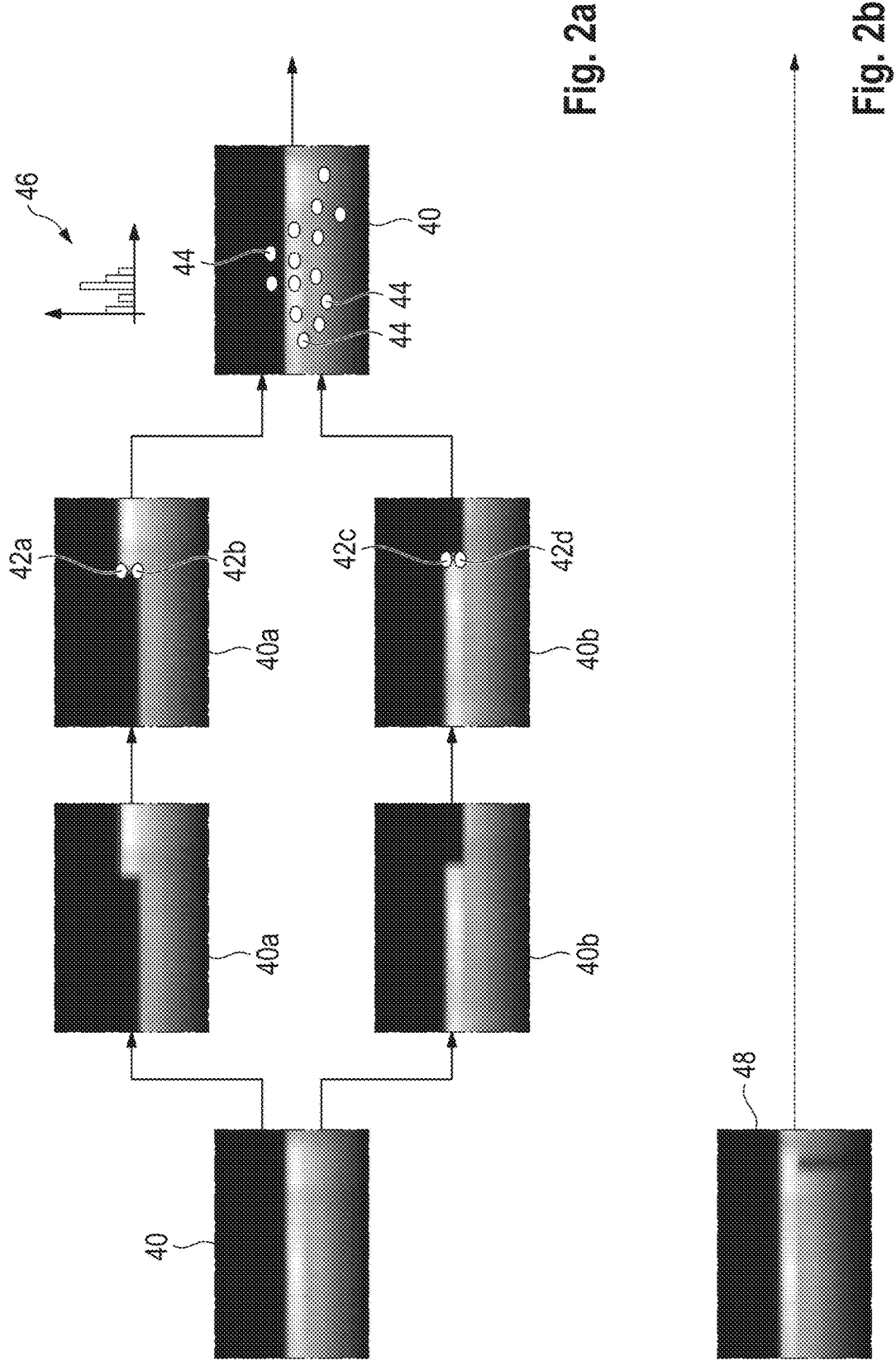
FIGS. 2*a* and 2*b* show a schematic illustration of examples for images which are used in at least one embodiment, here e.g. the first embodiment, of the method according to the invention.

As described herein, a luminous property of a headlamp can be analyzed in more detail.

A method according to an embodiment of the invention provides for checking the plausibility of detected features of a light distribution of a headlamp of a motor vehicle. Here, the headlamp irradiates a scene in surroundings of the motor vehicle, wherein the irradiated scene is captured in an image by a camera of the motor vehicle. At least one initial optical feature is dynamically sought after and identified in the image. Moreover, local surroundings of this at least one initial optical feature are adaptively produced and analyzed, wherein at least one further optical feature is dynamically extracted from the local surroundings. Using a learned algorithm, an adaptive check is carried out on the basis of the ascertained optical features as to whether the optical features are plausibly arranged in the local surroundings.

Hence, the scene is irradiated and/or illuminated in surroundings of the motor vehicle by means of the headlamp, with the irradiated and/or illuminated scene being captured in the image by the camera of the motor vehicle.

The at least one further optical feature is extracted from the local surroundings and, in a possible configuration, the position thereof in relation to the at least one initial optical feature is ascertained, wherein, on the basis of the ascertained position of the optical features in the local surroundings, there is active checking as to whether the optical features in the local surroundings have a correct position in relation to one another and/or are plausibly arranged in relation to one another.

A luminous property of the headlamp is described by the described optical features, which are usually image points or pixels, by way of the light distribution thereof. The luminous property of the headlight is to be described by way of a relative position of the optical features in relation to one another, established within the scope of the method, i.e. the position of the at least one initial optical feature in relation to the at least one further optical feature and/or the position of further optical features in the surroundings of the at least one initial optical feature in relation to one another. The actual position, and hence actual luminous property, captured by way of the relative position of the optical features in relation to one another is compared to an intended position, and hence intended luminous property, provided to this end.

The at least one optical feature, in one configuration the at least one initial optical feature, is determined, for example extracted and identified, at the light/dark boundary of the captured image. By way of example, the further optical features are to likewise be determined at a light/dark boundary. Furthermore, it is possible for the at least one optical feature to be ascertained using a histogram. Alternatively, or in a complementary fashion, the at least one optical feature is ascertained on the basis of grayscale values of the captured image.

At least one optical feature embodied as a point or image point or pixel is determined. The further optical features reflect a position of the at least one initial optical feature. Furthermore, an intended pattern for optical features, and hence the relative position thereof in relation to one another, is predetermined for the local surroundings and this is compared to an actual pattern, captured by the camera, for the optical features, i.e. the relative position thereof in relation to one another. In one configuration, the intended pattern is ascertained or predetermined by the self-learning algorithm.

In a method, e.g. an arrangement of a test bench is irradiated and/or illuminated by the headlamp as a scene. Alternatively, or in a complementary manner, the method is carried out when the motor vehicle is driving, wherein an arrangement in surroundings of the motor vehicle being irradiated and/or illuminated by the headlamp as a scene.

A system according to an embodiment of the invention is configured to check the plausibility of characteristic points of a light distribution of a headlamp of a motor vehicle and includes a camera and a processor or processor core, wherein the headlamp is to be used to irradiate and/or illuminate a scene in surroundings of the motor vehicle. The camera is embodied to capture the irradiated and/or illuminated scene in an image. The processor or processor core is configured to dynamically search and identify at least one initial optical feature in the image, adaptively produce and analyze local surroundings of this at least one initial optical feature, dynamically extract at least one further optical feature from the local surroundings and adaptively check, by means of a learned algorithm, on the basis of the ascertained optical features in the local surroundings as to whether the optical features are plausibly arranged in the local surroundings.

The processor or processor core is furthermore configured to dynamically search and identify at least one optical feature, for example by means of an edge detector. Here, similar detectors are also conceivable, such as a corner detector.

In one implementation of a method, a special filter chain is used to dynamically extract a so-called H0V0 point from the image as the at least one initial optical feature. This H0V0 point is an origin (0/0) of a coordinate system with a horizontally oriented abscissa (H) and a vertically oriented ordinate (V). This H0V0 point, and hence the at least one initial optical feature, is arranged at the light/dark boundary of the headlamp. Using the method, the position of the at least one initial feature is to be checked dynamically and adaptively.

As soon as the at least one initial feature is detected within the scope of the method by using the learned algorithm, it is used for locally considering the image captured by the camera. Here, it is possible for the at least one initial optical feature to be able to be embodied as a central point of the local surroundings to be examined, or it may be situated at a defined relative distance therefrom. A local consideration of the image is carried out for these local surroundings as portion of the image. Furthermore, optical features are dynamically extracted from the local surroundings as portion of the image, with these further optical features e.g. reflecting the position of the originally or initially extracted optical feature within the scene observed by the camera and illuminated by the headlamp. An option emerging herefrom is that of, inter alia, classifying the position of each optical feature, which was extracted and/or detected in the local surroundings within the scope of the method within the scene taking into account the learned algorithm and adaptively checking said position.

By checking or examining the relative position of the optical features of the headlamp, a light distribution of the headlamp is to be determined and automatically adapted in the case of a deviation from an envisaged light distribution. By way of example, the headlamp is embodied as a matrix headlamp which comprises a multiplicity of light-emitting diodes (LEDs). When checking the plausibility of the light distribution of the headlamp, the light emitted thereby is captured and a reflection of the light in the scene is evaluated to the effect that the headlamp is to be actuated in accordance with a uniform light distribution.

In the method, which is able to be carried out with the aid of a camera of an assistance system of the motor vehicle, the image captured by the camera, i.e. at least the local surroundings of the image, is classified on the basis of individual representative features or image points. The position or arrangement of the captured actual pattern of the optical features differs depending on the configuration of the headlamp and functionality to be checked, wherein an intended pattern is provided to this end, depending on the functionality of the headlamp to be checked, for the position of the optical features, wherein this intended pattern is to be ascertained using the self-learning algorithm. A typical and significant position of the optical features in relation to one another is stored in the computing unit, and hence in a control appliance, as a predefined intended pattern. Now, when checking the plausibility or checking the light distribution, the captured actual pattern is compared to the predetermined intended pattern and a decision is made as to whether the light distribution provided according to the intended pattern is realized.

Overall, a plausibility of detected features from a light distribution of a headlamp should be checked using the method. Here, in one configuration, at least one dynamic feature is initialized within the local surroundings, the further features being based on said dynamic feature. In the process, it is possible to check the plausibility of the at least one initial feature on the basis of the relative position of the features in relation to one another. In so doing, it is furthermore possible to ascertain as many features as necessary within the surroundings.

The quality of the headlamp is to be determined on the basis of pixels as optical features when checking the plausibility of the light distribution of the headlamp. Moreover, a position of the headlamp is to be ascertained on the basis of the origin or H0V0 point of the coordinate system as optical feature. Moreover, the local surroundings around the at least one initial optical feature are defined as region to be observed, wherein histograms and/or grayscale values are examined within this region.

To this end, the self-learning algorithm is applied in a training phase in one configuration, said self-learning algorithm predetermining how the image around the at least one initial optical feature, usually around the at least one initial point, should look and how the local surroundings are to be set for at least one further optical feature.

It is understood that the features mentioned above and the features yet to be explained below may be used not only in the respectively specified combination, but also in other combinations or on their own, without departing from the scope of the present invention.

The figures are described together and in an overarching manner. The same reference signs are assigned to the same components or aspects.

The embodiment of the system 2 according to the invention for checking the plausibility of characteristic points in light distributions of a headlamp 4 of a motor vehicle, depicted schematically in FIG. 1, comprises a camera 6 of an assistance system of the motor vehicle and a computing unit 8, which is embodied as a component of a control appliance of the motor vehicle in this case.

The embodiments of the method according to the invention, presented on the basis of subsequent FIGS. 2 to 6, are able to be carried out using the system presented here.

A scene 10 in surroundings of the motor vehicle is illuminated by the headlamp 4 for the purposes of carrying out the respective embodiment of the method. Furthermore, an image 12 of the scene is captured by the camera 6. Furthermore, this image 12 is examined by the computing unit 8, with an initial optical feature 14, in this case an image point at a light/dark boundary of the image 12, being dynamically sought after and identified in the image 12 by the computing unit 8. Furthermore, local surroundings 16 as portion of the image 12 are adaptively produced and analyzed around this initial optical feature 14, with provision being made here for the initial optical feature 14 to form a midpoint of the local surroundings 16. Accordingly, it is possible to span the local surroundings 16 proceeding from the initial optical feature 14 as midpoint or center.

Moreover, a plurality of further optical features 18a, 18b, 18c here are dynamically extracted from the local surroundings 16 and the relative position thereof in relation to the initial optical element 14, but also relative to one another, is ascertained. Here, only three of such optical features 18a, 18b, 18c from a relatively large number of optical features are depicted in this case in an exemplary manner. An adaptive check is carried out on the basis of the established position of the optical features 14, 18a, 18b, 18c in the local surroundings 16 as to whether at least two of these optical features 14, 18a, 18b, 18c, usually all optical features 14, 18a, 18b, 18c, have the correct position relative to one another.

Here, provision is made in one configuration for an intended position to be predetermined for the optical features 14, 18a, 18b, 18c after an intended pattern is predetermined. Here, provision is made for this intended pattern to be ascertained using a self-learning algorithm. During the method, a current position of the optical features 14, 18a, 18b, 18c relative to one another, which corresponds to an actual pattern, is captured.

A quality of a light distribution of the headlamp, which emerges from the current position of the optical features 14, 18a, 18b, 18c relative to one another, is to be ascertained on the basis of a deviation of the actual pattern from the intended pattern.

In the first embodiment of the method according to the invention, a quality control of a light distribution of a headlamp embodied as a matrix headlamp is checked. Here, a first original image 40 is assumed in FIG. 2a, said image being the light distribution as captured by a camera. This original image 14 is decomposed into a first image 40a, embodied as a partial image, and a second image 40b, embodied as a partial image, which have two light distributions. Here, pixels are assigned to the camera in a first of the two images 40a, 40b and black/white pixels are assigned to the light distributions in the second of the two images 40a, 40b.

Then, two initial optical features 42a, 42b, 42c, 42d, e.g. optical points or pixels in this case, are extracted from the two images 40a, 40b in each case. In one configuration, grayscale values of a feature 42a, 42b, 42c, 42d, e.g. of a point or pixel in surroundings of a local histogram 46 are selected in this case. The data relating to the dynamic initial features 42a, 42b, 42c, 42d are tapped in a problem-specific manner and this is the result of a learning phase of an algorithm. During a working phase, this tapping of the data is uniquely defined depending on the problem. (Details in this respect emerge from FIG. 6.) Furthermore, a plurality of optical features 44, embodied here as points, are extracted from the original image 40 in surroundings of the initial features 42a, 42b, 42c, 42d. These extracted optical features 44 are evaluated using the histogram 46 and/or the learned algorithm, with the light distribution being ascertained as being in order in this case.

In the case of the original image 48, which was taken of a light distribution of a headlamp by a camera, provision is made in the diagram from FIG. 2b for the light distribution to have a defect. In this respect, as in the example of the original image from FIG. 2a, a decomposition into partial images is carried out, initial features being tapped in said partial images, with optical features then being extracted from the surroundings of the initial features. In this case, it is determined that the features in the original image 48 are not in order.

Figure 3:
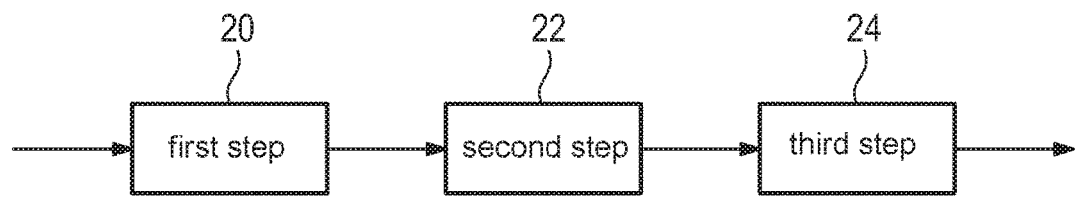
FIG. 3 shows a diagram relating to a second embodiment of the method according to the invention.

In the third embodiment of the method, which is depicted on the basis of the diagram in FIG. 3, the at least one initial optical feature 14, 42a, 42b, 42c, 42d, in this case a characteristic optical feature 14, 42a, 42b, 42c, 42d, is dynamically found in the image 12, 40, 48 from FIG. 1 or 2 in a first step 20. Proceeding from the at least one initial optical feature 14, 42a, 42b, 42c, 42d, the local surroundings 16 thereof are considered in a second step 22. The further optical features 18a, 18b, 18c, 44 are extracted from these local surroundings 16. In a third step 24, the dynamically provided optical features 14, 18a, 18b, 18c, 42a, 42b, 42c, 42c, 44 are evaluated in respect of a relative position in relation to one another within the local surroundings 16 of the image 12. A measure for a quality of the light distribution of the headlamp 4 is ascertained on the basis of a possible deviation of the currently captured position of the optical features 14, 18a, 18b, 18c, 42a, 42b, 42d, 42c, 44 from a position predetermined in accordance with the intended pattern.

Figure 4:
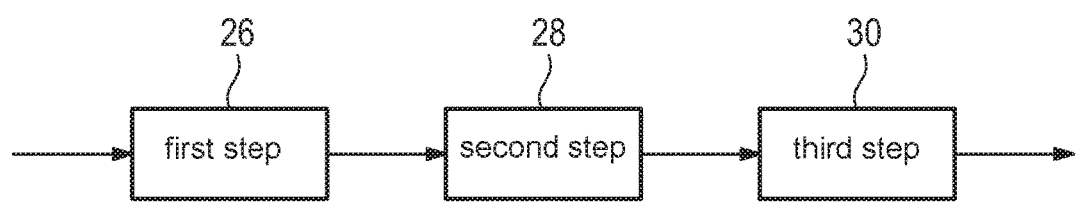
FIG. 4 shows a diagram relating to a third embodiment of the method according to the invention.

In the fourth embodiment of the method, shown using the diagram from FIG. 4, the image 12, 40, 48 from FIG. 1 or 2 is provided to a filter chain in a first step 26, said filter chain being embodied to dynamically detect at least one initial optical feature 14, 42a, 42b, 42c, 42d, embodied as an image point, at a light/dark boundary of the image 12, 40, 48. Here, this at least one initial optical feature 14, 42a, 42b, 42c, 42d is also to be referred to and/or embodied as H0V0 point. In a subsequent second step 28, the local surroundings 16 spanned proceeding from the at least one initial feature 14, 42a, 42b, 42c, 42d are considered. Here, further optical features 18a, 18b, 18c, 44 are extracted from the local surroundings 16. The dynamically provided optical features 14, 18a, 18b, 18c, 42a, 42b, 42c, 42d are evaluated in a third step 30. On the basis thereof, it is possible to ascertain whether the at least one initial optical feature 14, 42a, 42b, 42c, 42d, embodied as H0V0 point, has been detected at a correct location provided therefore.

Figure 5:
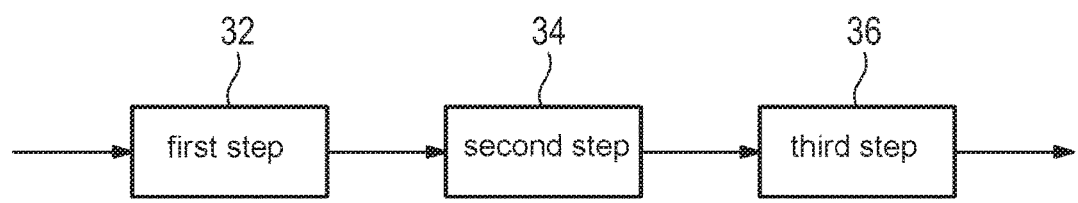
FIG. 5 shows a diagram relating to a fourth embodiment of the method according to the invention.

The fifth embodiment of the method is depicted on the basis of the diagram in FIG. 5. Here, at least one special light distribution, as a rule a plurality of special light distributions, is/are produced in the image 40 in a first step 32, with a plurality of initial optical features 42a, 42b, 42c, 42d being found e.g. dynamically. Proceeding from these initial optical features 42a, 42b, 42c, 42d, local surroundings are spanned around the initial optical features 42a, 42b, 42c, 42d in a second step 32. The further optical features 44 are extracted from these local surroundings. In a third step 36, the dynamically provided optical features 42a, 42b, 42c, 42d, 44 are evaluated in respect of a relative position in relation to one another within the local surroundings of the image. From this, a quality of a light distribution of the headlamp is ascertained and there is an assessment as to whether it comprises segments, e.g. light segments, which are in order or not in order, taking into account the learned algorithm.

In the presented embodiments of the method, an edge detection of the headlamp 4 is carried out at a light/dark boundary of an image 12, 40, 48, with similar methods (e.g. a corner detection) also being possible. The at least one initial optical feature 14, 42a, 42b, 42c, 42d dynamically extracted in the process is subject to environmental variations in respect of the position thereof, for example due to a change of a projection surface which is often not uniquely identifiable within the scope of an edge detection. In order to achieve a higher accuracy of the system 2, provision is made for classifying the position of the at least one extracted initial optical feature 14, 42a, 42b, 42c, 42d in the scene 10 depicted by the image 12, 40, 48 and adaptively checking the latter. Proceeding from information provided in the process, a decision is made as to whether, in respect of the position thereof relative to one another, extracted optical features 14, 18a, 18b, 18c, 42a, 42b, 42c, 42d, 44 correspond to a desired quality of a light distribution of the considered headlamp 4. No information is required in respect of a geometric position of the headlamp 4 and the orientation or the alignment thereof as a result of an adaptive initialization of the local surroundings 16, provided within the scope of the method, for considering the optical features 14, 18a, 18b, 18c, 42a, 42b, 42c, 42d, 44.

Figure 6:
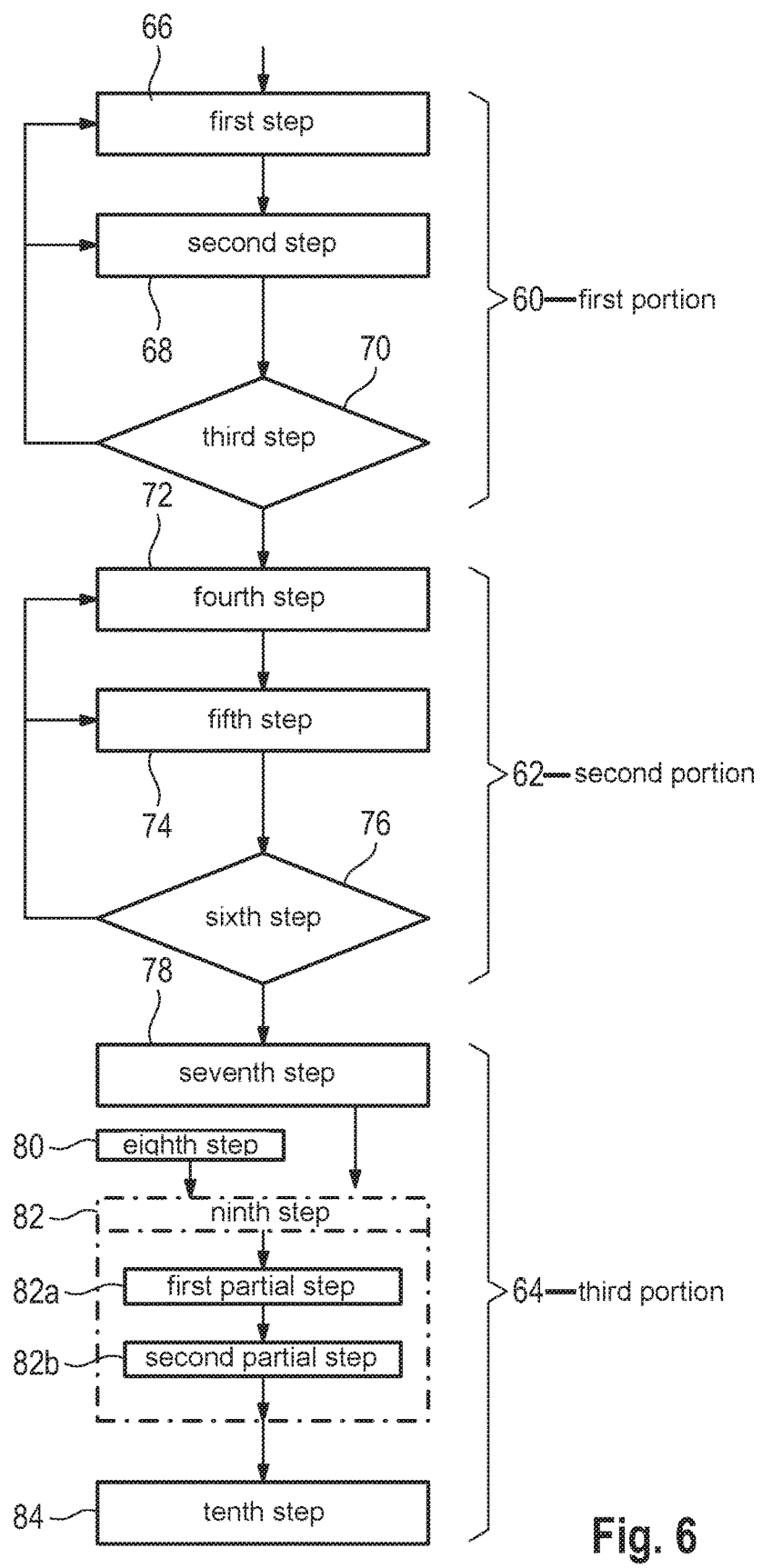
FIG. 6 shows a diagram relating to a fifth embodiment of the method according to the invention.

The fifth embodiment of the method is depicted on the basis of the diagram in FIG. 6, with this diagram showing a workflow and/or a functional principle of a self-learning algorithm. This diagram comprises a first portion 60, in which a problem is formulated. A training phase for the self-learning algorithm is carried out in a second portion 62. A subsequent third portion 64 of the diagram relates to a working phase.

When formulating the problem, which is to be carried out in a first portion 60, a real problem is abstracted into a classification problem in a first step 66. In respect of an automatic adjustment of a headlamp and/or of the light distribution of this headlamp, there is ascertainment in respect of a first classification as to whether an initial optical feature, the H0V0 point in this case, is identified correctly in an image. As an alternative thereto, it is possible within the scope of a second classification that this initial feature is not identified.

Optical features on which the classification is intended to be based are defined in a second step 68. This means that the H0V0 point is extracted by image processing. Furthermore, a partial image or sub-image, which may be centered around the H0V0 point or lies at a defined relative distance therefrom and has local surroundings with a defined size, is cut from a complete image of a camera, for example a driver-assistance camera. Furthermore, a light distribution of this partial image is normalized, wherein the partial image has a light distribution with a value of one at the center thereof, where the H0V0 point is arranged. Then, final optical features are extracted from the normalized partial image, and hence from the local surroundings. In the process, it is possible to use the entire normalized partial image. Alternatively, or in a complementary manner thereto, histograms or further grayscale-value-based features are extracted from the surroundings, and hence from the partial image.

In a third step 70 of the first portion 60, a check is carried out as to whether there is a measurement method, which is able to be used to determine the optical features and/or a class membership. If it emerges in the third step 70 that no such measurement method exists, the method is carried out with the first or second step 66, 68.

However, should such a measurement method exist, the method is continued with a fourth step 72 in the second portion 62. In this fourth step 72, training data and/or test data are generated and hence produced on the basis of measurements. Here, such training data and test data comprise training points or test points which, in turn, form a pair (X, c). Here, X denotes the set of the extracted optical features of the partial image 16 and c denotes the class assigned to this set X.

Then, the algorithm is learned in a fifth step 74 on the basis of the training data, both while assessing a classification capability and on the basis of the test data. Here, training data are provided to the algorithm during the learning. On the basis of the training data, a decision rule is learned by the algorithm, said decision rule e.g. defining how a feature X must look in order to belong to a certain class c. Furthermore, the ability of generalizing the learned model is tested during the learning on the basis of the test data.

Here, the algorithm supplies a propagated class $c_{actual}$ on the basis of the set of the extracted optical features X of the partial image 16 of a training point/test point. This propagated class $c_{actual}$ is compared to a defined class $c_{intended}$. If $c_{actual}=c_{intended}$, the training point/test point was classified correctly. If ($c_{actual} \neq c_{intended}$), the training point was not classified correctly by the learned model. In order to assess the quality of the learned model, the error, more precisely the training error, is considered over all training points and used as a statistical quality measure.

A check as to whether a classification accuracy has been achieved is carried out in a sixth step 76. An assessment in this respect is carried out on the basis of statistical quality measures, for example on the basis of classification errors on the basis of test data and training data.

If the classification accuracy is not achieved in the sixth step 76, the method is carried out in the fourth or fifth step 72, 74.

However, if the classification accuracy is reached, the method is continued with a seventh step 78 in the third portion 64, which describes the working phase. In this seventh step 78, the learned algorithm is used as decision rule for a formulated problem. Moreover, at least one optical feature is extracted for formulating the problem in an eighth step 80.

Thereafter, a work cycle is carried out in a ninth step 82. It comprises an input or reception of at least one optical feature in a first partial step 82a. In a second partial step 82b, the learned algorithm is applied as decision rule for this at least one optical feature, with a class membership of the at least one optical feature being output. What should be taken into account in the working cycle, inter alia, is that the method is continued with formulating the problem (first portion 60) or in the training phase (second portion 62) in the case where the results obtained in the process are insufficient in a superordinate process. Usually, all captured data about optical features are ascertained and stored when testing for the automated adjustment of the headlamp in the process of checking the plausibility of the light distribution of the headlamp. In the process, it is possible that the H0V0 point in the traffic space is detected as an optical feature by way of the image processing. The optical features are then extracted. Using the learned algorithm, a decision in respect of the correctness and/or quality of the H0V0 point as an optical feature is provided. In accordance with the decision, the H0V0 point is included in a maladjustment calculation of the headlamp. Thereupon, provision is made for the superordinate process to provide the calculated maladjustment of the headlamp. If the calculated maladjustment is to be evaluated as erroneous by an external reference measurement, an assessment should be made on the basis of the stored data as to whether, possibly, a lacking decision rule is responsible for this.

In the subsequent tenth step 84, the class membership is processed in the superordinate process. A determination is carried out in respect of the automatic adjustment of the headlamp as to whether the detected H0V0 point is correct, and hence used for a calculation, or whether it should be discarded.

It is possible to integrate at least one driver assistance function into a pixel-based system from the at least one headlamp on the basis of correct and desired functions of a light segment of a headlamp using the presented embodiments of the method. Here, the embodiments of the method are to be applied when checking the plausibility of the light distribution of the headlamp or qualitatively checking the latter. A result of the method provides a statement in respect of whether a light segment, and which light segment, of the headlamp has a defect. This statement is based in turn on the image of the light distribution of the headlamp taken by the camera. Here, at least one initial optical feature or at least one point is sought after in the process. Further dynamic optical features are extracted in local surroundings of arbitrary size and arbitrary form on the basis of coordinates of this initial point as initial optical feature. The dynamically extracted further features are to be designed on the basis of values of the pixels of these features and/or while taking into account local histograms. The evaluation is implemented on the basis of such features, with a capability for evaluation being learned by the algorithm.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for evaluating a light distribution generated by a headlamp of a motor vehicle, the method comprising:
    irradiating, by the headlamp, a scene in surroundings of the motor vehicle,
    capturing, by a camera of the motor vehicle, the irradiated scene as an image,
    identifying, in the image, an initial optical feature;
    identifying, in the image, at least one further optical feature in local surroundings of the initial optical feature;
    determining actual relative positions in the image, the actual relative positions in the image being actual positions of the initial optical feature and the at least one further optical feature relative to one another;
    determining, using a learned algorithm, intended relative positions, the intended relative positions being intended positions of the initial optical feature and the at least one further optical feature relative to one another;
    comparing the actual relative positions in the image to the intended relative positions in order to determine a deviation of an actual pattern of optical features generated by the headlamp from a pattern of optical features intended to be generated by the headlamp; and
    determining a quality of the light distribution of the headlamp on a basis of the deviation.

2. The method as claimed in claim 1, wherein at least one of the initial optical feature or the at least one further optical feature is ascertained at a light/dark boundary of the captured image.

3. The method as claimed in claim 1, wherein at least one of the initial optical feature or the at least one further optical feature is ascertained using a histogram.

4. The method as claimed in claim 1, wherein at least one of the initial optical feature or the at least one further optical feature is ascertained on the basis of grayscale values of the captured image.

5. The method as claimed in claim 1, wherein at least one of the initial optical feature or the at least one further optical feature is embodied as a point.

6. The method as claimed in claim 1, wherein an arrangement of a test bench is irradiated by the headlamp as the scene.

7. The method as claimed in claim 1, wherein the method is carried out when the motor vehicle is in motion, wherein an arrangement in surroundings of the motor vehicle is irradiated by the headlamp as the scene.

8. A system for evaluating a light distribution generated by a headlamp of a motor vehicle, wherein the headlamp is to be used to irradiate a scene in surroundings of the motor vehicle, the system comprising:
    a camera configured to capture the irradiated scene as an image, and
    a processor configured to:
        identify, in the image, an initial optical feature,
        identify, in the image, at least one further optical feature in local surroundings of the initial optical feature, determine actual relative positions in the image, the actual relative positions in the image being actual positions of the initial optical feature and the at least one further optical feature relative to one another, and determine, using a learned algorithm, intended relative positions, the intended relative positions being intended positions of the initial optical feature and the at least one further optical feature relative to one another, compare the actual relative positions in the image to the intended relative positions in order to determine a deviation of an actual pattern of optical features generated by the headlamp from a pattern of optical features intended to be generated by the headlamp, and determine a quality of the light distribution of the headlamp on a basis of the deviation.

9. The system as claimed in claim 8, wherein the processor is configured to identify the at least one optical feature using a detector.

\* \* \* \* \*